United States Patent
Tandi et al.

(10) Patent No.: US 10,154,322 B2
(45) Date of Patent: Dec. 11, 2018

(54) FAST RECOVERY OF FIBRE CHANNEL (FC) LINK USING DELAYED NOS MESSAGE AFTER FC LINK FAILURE

(71) Applicant: Cisco Technology, Inc., San Jose, CA (US)

(72) Inventors: Giovanni Tandi, Fara Gera d'Adda (IT); Gilberto Loprieno, Milan (IT)

(73) Assignee: Cisco Technology, Inc., San Jose, CA (US)

(*) Notice: Subject to any disclaimer, the term of this patent is extended or adjusted under 35 U.S.C. 154(b) by 193 days.

(21) Appl. No.: 14/734,596

(22) Filed: Jun. 9, 2015

(65) Prior Publication Data
US 2016/0366497 A1 Dec. 15, 2016

(51) Int. Cl.
H04B 10/03 (2013.01)
H04Q 11/00 (2006.01)

(52) U.S. Cl.
CPC ......... H04Q 11/0005 (2013.01); H04B 10/03 (2013.01); *H04Q 2011/0043* (2013.01); *H04Q 2011/0052* (2013.01)

(58) Field of Classification Search
None
See application file for complete search history.

(56) References Cited

U.S. PATENT DOCUMENTS

| | | | |
|---|---|---|---|
| 6,433,903 B1 * | 8/2002 | Barry | H04B 10/0731 398/79 |
| 8,243,619 B2 | 8/2012 | Bianchi et al. | |
| 8,644,340 B2 | 2/2014 | Loprieno et al. | |
| 9,020,358 B2 | 4/2015 | Smith | |
| 2009/0190466 A1 * | 7/2009 | Girardi | H04L 41/0681 370/216 |
| 2010/0098407 A1 * | 4/2010 | Goswami | H04B 10/032 398/5 |
| 2010/0183022 A1 | 7/2010 | Berman | |
| 2011/0038629 A1 * | 2/2011 | Johansson | H04B 10/272 398/58 |
| 2011/0116789 A1 * | 5/2011 | Wellbrock | H04J 14/0279 398/5 |
| 2014/0198636 A1 | 7/2014 | Thayalan et al. | |

OTHER PUBLICATIONS

Rich Taborek, "8B10B Transmission Code as a Link Protocol Building Block", Mar. 12, 1996, Amdahl Corp., IEEE 802.3 HSSG Gigabit Ethernet, 36 pages.*

* cited by examiner

Primary Examiner — Ken N Vanderpuye
Assistant Examiner — David Lambert
(74) Attorney, Agent, or Firm — Edell, Shapiro & Finnan, LLC (57) ABSTRACT

An optical system is provided that converts optical signals received over an optical trunk from a first optical switch to client optical signals intended for a second optical switch. The first and second optical switches operate in accordance with a Fiber Channel (FC) protocol. An interruption of the optical signals on the optical trunk is detected. Responsive to the interruption, a Not Operational State (NOS) message sent to the second optical switch is delayed so as to delay triggering of an FC link initialization in the second optical switch. While the NOS message is delayed, idle messages are sent to the second optical switch.

20 Claims, 10 Drawing Sheets

FIG.10

FAST RECOVERY OF FIBRE CHANNEL (FC) LINK USING DELAYED NOS MESSAGE AFTER FC LINK FAILURE

TECHNICAL FIELD

The present disclosure relates to optical networking.

BACKGROUND

Optical switches may inter-operate in accordance with the (Fibre Channel) FC protocol. Such FC switches exchange messages with each other in accordance with the FC protocol to establish an FC link between the switches. The exchange of messages is referred to as "FC initialization" or an "FC initialization phase," and may take as much as 10 seconds to complete. Detection of a failure on an established FC link, that interrupts optical signals conveyed by the link, almost immediately, e.g., within a few milliseconds (ms), triggers FC initialization. FC link failure failover protection may restore physical connections that support the interrupted FC link in under 50 ms, but the triggered FC initialization will delay the full reestablishment of the FC link until the FC initialization is complete. Such a delay is inconvenient and wastes available communication resources.

DESCRIPTION OF EXAMPLE EMBODIMENTS

Overview

An optical system is provided that converts optical signals received over an optical trunk from a first optical switch to client optical signals intended for a second optical switch. The first and second optical switches operate in accordance with a Fibre Channel (FC) protocol. An interruption of the optical signals on the optical trunk is detected. Responsive to the interruption, a Not Operational State (NOS) message sent to the second optical switch is delayed so as to delay triggering of an FC link initialization in the second optical switch. While the NOS message is delayed, idle messages are sent to the second optical switch.

Detailed Description

Figure 1:
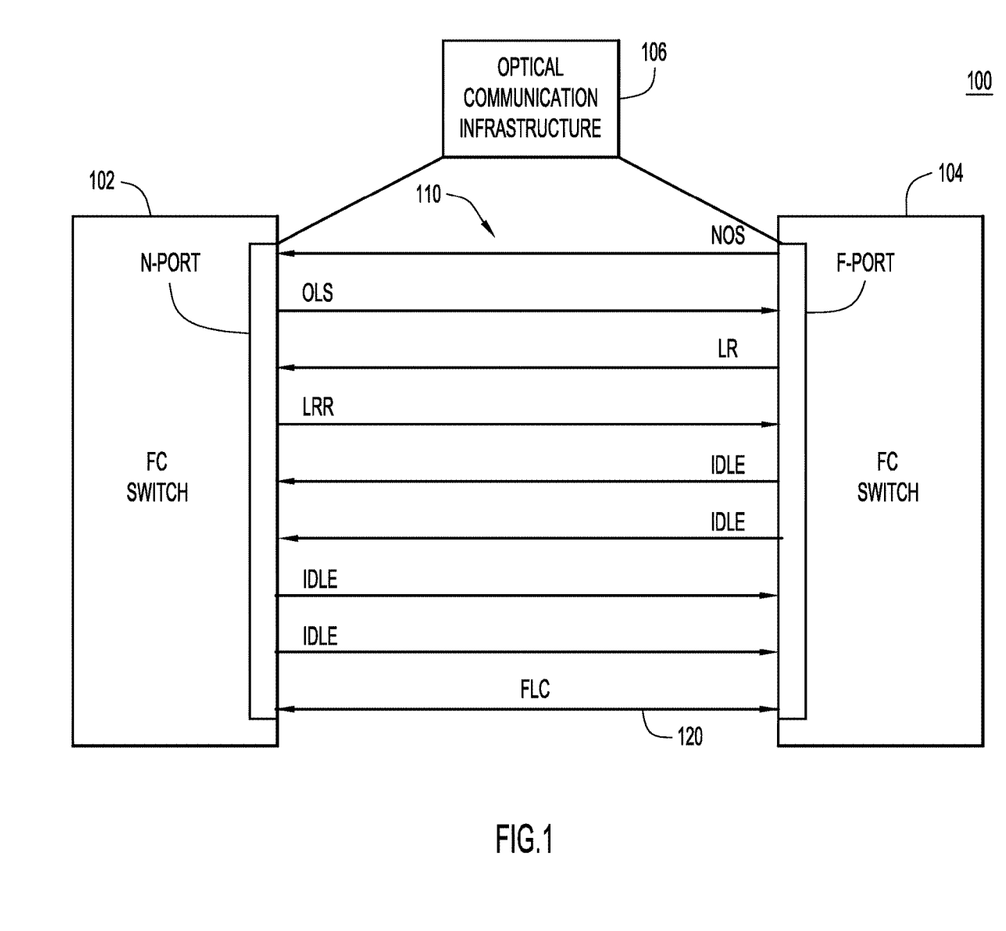
FIG. 1 is a block diagram of optical switches (fabrics) that inter-operate in accordance with the FC protocol over an optical infrastructure to perform FC initialization, according to an example embodiment.

With reference to FIG. 1, there is a block diagram of optical switches (or fabrics) 102 and 104 that inter-operate in accordance with the Fibre Channel (FC) protocol over an optical infrastructure 106 connected between an N-port of optical switch 102 and an F-port of optical switch 104. Examples of optical communication infrastructure 106 include optical fibers, optical repeaters, and optical muxponders and transponders (not shown in FIG. 1). Optical (FC) switches 102 and 104 may inter-operate according to the FC protocol as defined in any of the FC standards, such as any "XG-FC" standard, defined by the T11 Committee of the International Committee on Information Technology Standards (INCITS), for example. Optical switches 102 and 106 exchange link control primitives or initialization messages 110 with each other in accordance with the FC protocol to initialize and establish an FC link (FCL) 120 between the switches. The exchange of messages 110 is referred to as "FC initialization" or an "FC initialization phase" and may take as much as 10 seconds to complete. FC switches 102, 104 may enter FC initialization when first powered-on or otherwise reset, or if a failure of an already established FC link between the FC switches interrupts optical signals conveyed by the link, as will be described more fully below.

To perform FC initialization, FC switch 104 initially sends a Not Operational State (NOS) message or frame to FC switch 102 because the F-Port has transitioned to an off-line condition, has been reset, or has detected a failure. The NOS message triggers full FC initialization between FC switches 102 and 104. Responsive to the NOS message, FC switch 102 sends an Offline State (OLS) message to FC switch 104 to begin FC link initialization. In response to the OLS message, FC switch 104 sends a Link Reset (LR) message to FC switch 102 to initiate an FC link reset operation. In response to the LR message, FC switch 102 sends a Link Reset Response (LRR) message to FC switch 104. After that, FC switches 102 and 104 exchange idle messages or frames used by each of the switches for bit, byte, and frame level (link) synchronization in order to establish bi-directional FC link 120 over which FC data frames may be exchanged between the switches.

Figure 2:
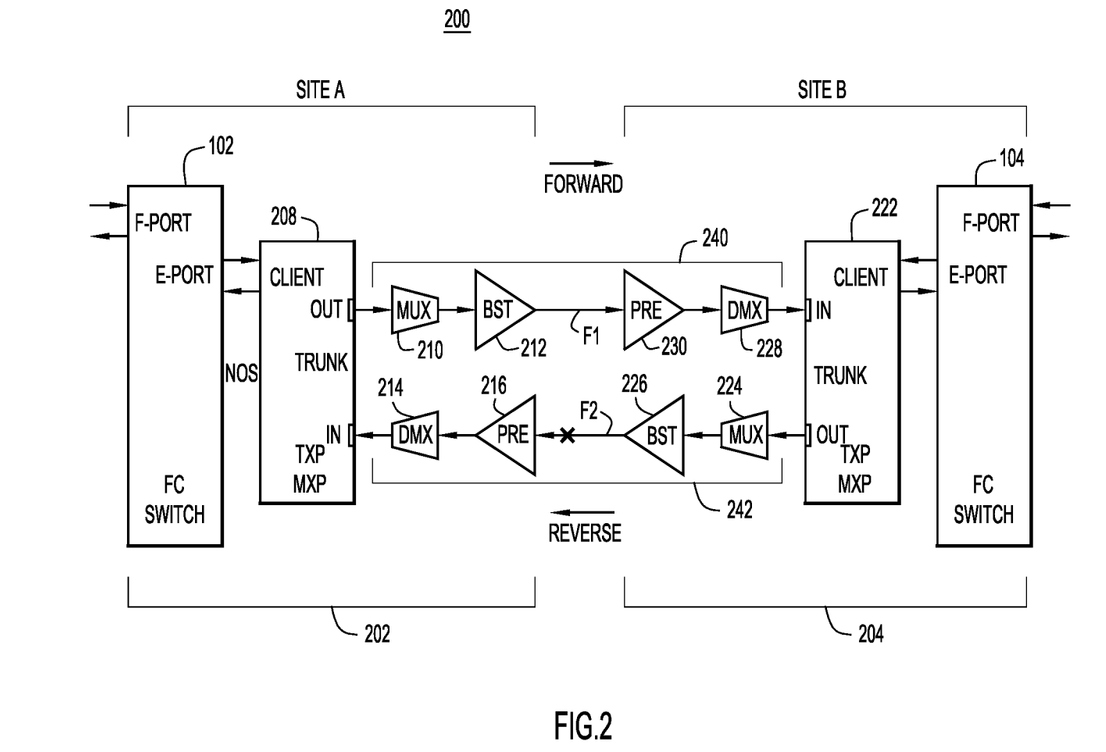
FIG. 2 is a block diagram of a system in a dense wavelength division multiplexing (DWDM) network and in which a delayed Not Operational State (NOS) message may be used, according to first example embodiment.

With reference to FIG. 2, there is a block diagram of a FC system 200 in which a delayed NOS message may be used according to an example embodiment. FC system 200 includes a first FC endpoint 202 (i.e., first FC devices 202) at a first site A that communicates in accordance with the FC protocol with a second FC endpoint 204 (i.e., second FC devices 204) at a second site B. Generally, FC endpoint 202 transmits FC frames to FC endpoint 204 in a forward direction and FC endpoint 204 transmit FC frames to FC endpoint 202 in a reverse direction over first and second optical fibers F1 and F2, respectively. Optical fibers F1 and F2 are referred to more generally as a "forward trunk" and a "reverse trunk," respectively, that each carry or convey optical signals also referred to as "trunk signals."

FC endpoint 202 includes: FC switch 102 having an F port to transmit and receive (i.e., transceive) FC frames, and an E-port on a client side of the switch 102; an FC transponder TXP/muxponder (MXP) 208 having a client port coupled to the E-port, an outbound trunk port ("Out") to transmit optical signals in the forward direction, and an inbound trunk port ("In") to receive optical signals inbound from the reverse direction; a dense wavelength division multiplexing (DWDM) optical multiplexer MUX 210 and an optical boost amplifier (BST) 212 coupled in series with each other between the outbound trunk port Out and optical fiber F1; and a DWDM optical demultiplexer (DMX) 214 and an optical preamplifier (PRE) 216 coupled in series with each other between optical fiber F2 and the inbound trunk port In.

Optical devices of FC endpoint 204 mirror those of FC system 202, and include: FC switch 104, a TXP/MXP 222, a DWDM multiplexer (MUX) 224, an optical boost amplifier (BST) 226, a DWDM optical demultiplexer (DMX) 228, and an optical preamplifier (PRE) 230. A forward path/link 240 between trunk port Out of TXP/MXP 208 and trunk port In of TXP/MXP 222, includes MUX 210, BST 212, optical fiber F1, PRE 230, and DMX 228. A reverse path/link 242 between the trunk port Out of TXP/MXP 222 and trunk port In of TXP/MXP 208, includes MUX 224, BST 226, optical fiber F2, PRE 216, and DMX 214.

TXP/MXP 208 and TXP/MXP 222 each convert "gray" optical client interface signals (received at the client port) into trunk signals (to be transmitted from the trunk port Out) that operate in a "colored" dense wavelength division multiplexing (DWDM) wavelength range. The client-facing gray optical signals generally operate at shorter wavelengths, whereas DWDM colored optical signals are in a longer wavelength range. A transponder (TXP) "transponds," i.e., performs transponding, and a muxponder (MXP) "muxponds," i.e., performs muxponding. Transponding or muxponding is the process of converting the grey and colored signals between the client and trunk wavelengths. The muxponder (MXP) generally handles several client signals. The MXP aggregates or multiplexes together lower rate client signals received at the client port and transmits the multiplexed signals from the trunk port at a higher rate. The MXP demultiplexes optical signals received from the trunk port and transmits the demultiplexed signals from individual client ports. The transponder (TXP) converts a single client signal to a single trunk signal and converts a single incoming trunk signal to a single client signal. TXP/MXP 208 and TXP/MXP 222 are also each referred to more generally as an "FC converter" that operates as a TXP to transpond and/or an MXP to muxpond, as and when necessary, to convert between client optical signals and trunk optical signals in accordance with the FC protocol. An architecture for each of TXP/MXP 208 and TXP/MXP 222 is described below in connection with FIG. 9.

FC switch 102 transmits optical signals to FC switch 104 in the forward direction and FC switch 104 transmits optical signals to FC switch 102 in the reverse direction, as is now described. In the forward direction, FC switch 102 receives optical signals at its F port and switches them to the E port, and the E port transmits the signals as client optical signals to the client port of TXP/MXP 208. TXP/MXP 208 converts the client optical signals to trunk optical signals (or simply "trunk signals") at trunk port Out, which transmits the trunk optical signals to optical fiber F1 through MUX 210 and BST 212. Optical fiber F1 delivers the trunk optical signals to trunk port In of TXP/MXP 222 through PRE 230 and DMX 228. TXP/MXP 222 converts the received trunk optical signals into client optical signals and transmits the client optical signals from the client port of the TXP/MXP to the E port of FC switch 104. FC switch 104 switches the client optical signals received at the E-port to the F-port.

Transmission in the reverse direction is substantially the same as in the forward direction, except that the optical signals traverse the following components in series: FC switch 104, TXP/MXP 222, MUX 224, BST 226, PRE 216, DMX 214, TXP/MXP 208, and FC switch 102.

As mentioned above, FC switches 102 and 104 initially perform FC initialization to establish a bi-directional FC link over forward trunk 240 and reverse trunk 242. During normal operation, TXP/MXP 208 and TXP 222 monitor their respective trunk ports In for any interruption of optical signals indicative of a trunk failure. In conventional operation, if either TXP/MXP 208 or TXP/MXP 222 detects such an interruption of optical signals, that TXP/MXP relatively immediately (e.g., within 5-10 ms), transmits an NOS message to the local FC switch. For example, if TXP/MXP 208 detects an interruption in optical signals received at its trunk port In (in FIG. 2, the interruption is indicated by an "X" intersecting reverse trunk F2), the TXP/MXP 208 sends an NOS message to FC switch 102 within 5-10 ms of the interruption. Receipt of the NOS message at the local FC switch (e.g., at FC switch 102) triggers FC initialization between FC switches 102 and 104 to re-establish the FC link. FC switches 102 and 104 need to complete FC initialization before resuming normal communication with each other, even if the failure recovers (i.e., the optical signals return) before the FC initialization is complete. This can waste time and resources in cases where the FC link recovers before FC switches 102 and 104 complete FC initialization.

Figure 3:
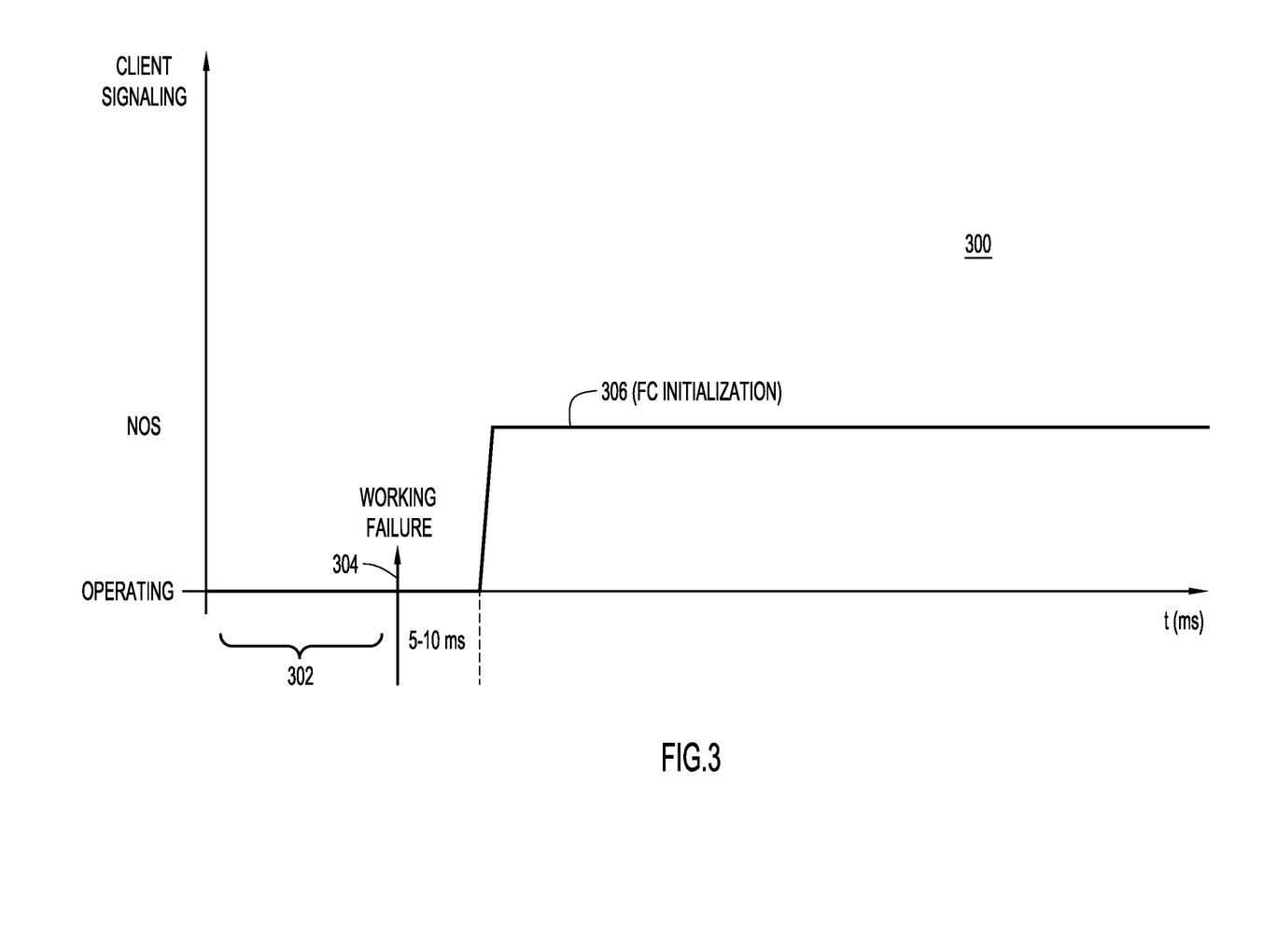
FIG. 3 is a timing diagram of operation in a system such as that shown in FIG. 2, but without using the delayed NOS message.

With reference to FIG. 3, there is shown a timing diagram 300 of the operation of the system of FIG. 2, where the y-axis represents client signaling (messages exchanged between a TXP/MXP and its local FC switch) and the x-axis represents time. During an initial period 302, FC switches 102 and 104 operate normally to exchange FC frames over FC link 120. At 304, an interruption of optical signals indicative of failure occurs and within 5-10 ms, TXP/MXP 208 or 222 detects the failure and immediately sends an NOS message to the local FC switch. The NOS message triggers FC initialization at 306, which continues for several seconds and prevents normal communication between switches 102 and 104 even if the failure recovers before FC initialization is complete.

In accordance with an example embodiment, there is a delayed issuance of the NOS responsive to a detected interruption of optical signals for a predetermined timeout period. The delayed NOS signal results in delaying the triggering of FC initialization, at least until the delay timeout has expired. As a result, if the optical signals return (to normal operation) before the timeout period expires, the FC switches can resume normal operation without having to wait an extended period of time for FC initialization to complete because the FC initialization was never triggered.

Figure 4:
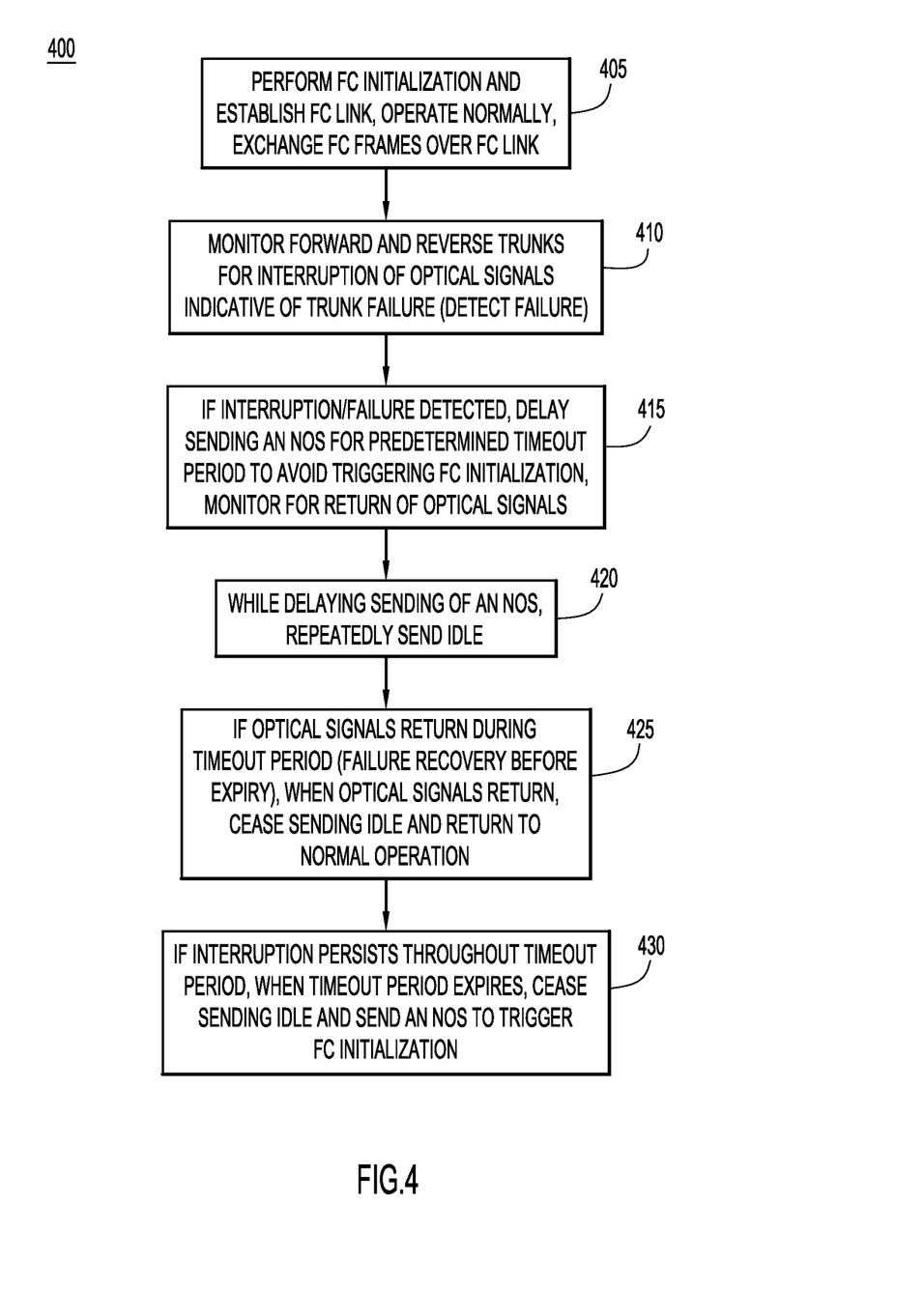
FIG. 4 is a flowchart of a method of delaying an NOS message responsive to an optical trunk failure, according to an example embodiment.

With reference to FIG. 4, there is a flowchart of an example method 400 of delaying an NOS message responsive to an interruption of optical signals performed by FC system 200, according to an example embodiment. Reference is made to FIGS. 1 and 2 for purposes of the description of FIG. 4.

At 405, FC switches 102 and 104 perform FC initialization and establish FC link 120, and operate normally to exchange optical signals over the link.

At 410, TXP/MXP 208 and TXP/MXP 222 monitor the reverse and forward trunks, respectively, for any interruption of optical signals indicative of failure. For example, each TXP/MXP measures a power level of the optical signals received on its trunk port In over time, and if the power level drops below a predetermined threshold indicative of failure, then a failure is detected/indicated, otherwise a failure is not detected.

At 415, if either TXP/MXP 208 or TXP/MXP 222 detects a failure, responsive to the detected failure, the TXP/MXP (e.g., TXP/MXP 208) starts a predetermined timeout period, and delays sending of an NOS message to the local FC switch (e.g., FC switch 102) for the timeout period so as to delay triggering of an FC link initialization in the local FC switch that would otherwise occur if the NOS message were sent immediately. The TXP/MXP also continues to monitor for a return of the interrupted optical signals, i.e., failure recovery.

At 420, while the TXP/MXP (e.g., TXP/MXP 208) delays sending of the NOS message for the predetermined timeout period, the TXP/MXP repeatedly sends idle messages to the local FC switch (e.g., switch 102) to enable the local FC switch to maintain bit, byte, and frame synchronization. In an example, the predetermined timeout period may be in a range between 100 ms and 500 ms, which is substantially less than the time needed for FC initialization, but the timeout period may also be below or above that range.

At 425, if the monitoring indicates that the failure recovers during the timeout period (i.e., failure recovery before the timeout period expires, responsive to the recovery (i.e., when the optical signals return), the TXP/MXP (e.g., TXP/MXP 208) ceases sending the idle messages to the local switch (e.g., switch 102) and does not send an NOS message, and system 200 resumes normal operation, i.e., the normal exchange of optical signals/fames between FC switches 102 and 104. In another embodiment, the TXP/MXP waits until the timeout period expires, and then ceases sending the idle messages.

At 430, if the monitoring indicates that the failure does not recover during the timeout period (i.e., the interruption of optical signals persists throughout the timeout period), when the timeout period expires, the TXP/MXP (e.g., TXP/MXP 208) ceases sending the idle messages, and sends an NOS message to the local FC switch (e.g., switch 102) to trigger FC initialization.

Figure 5:
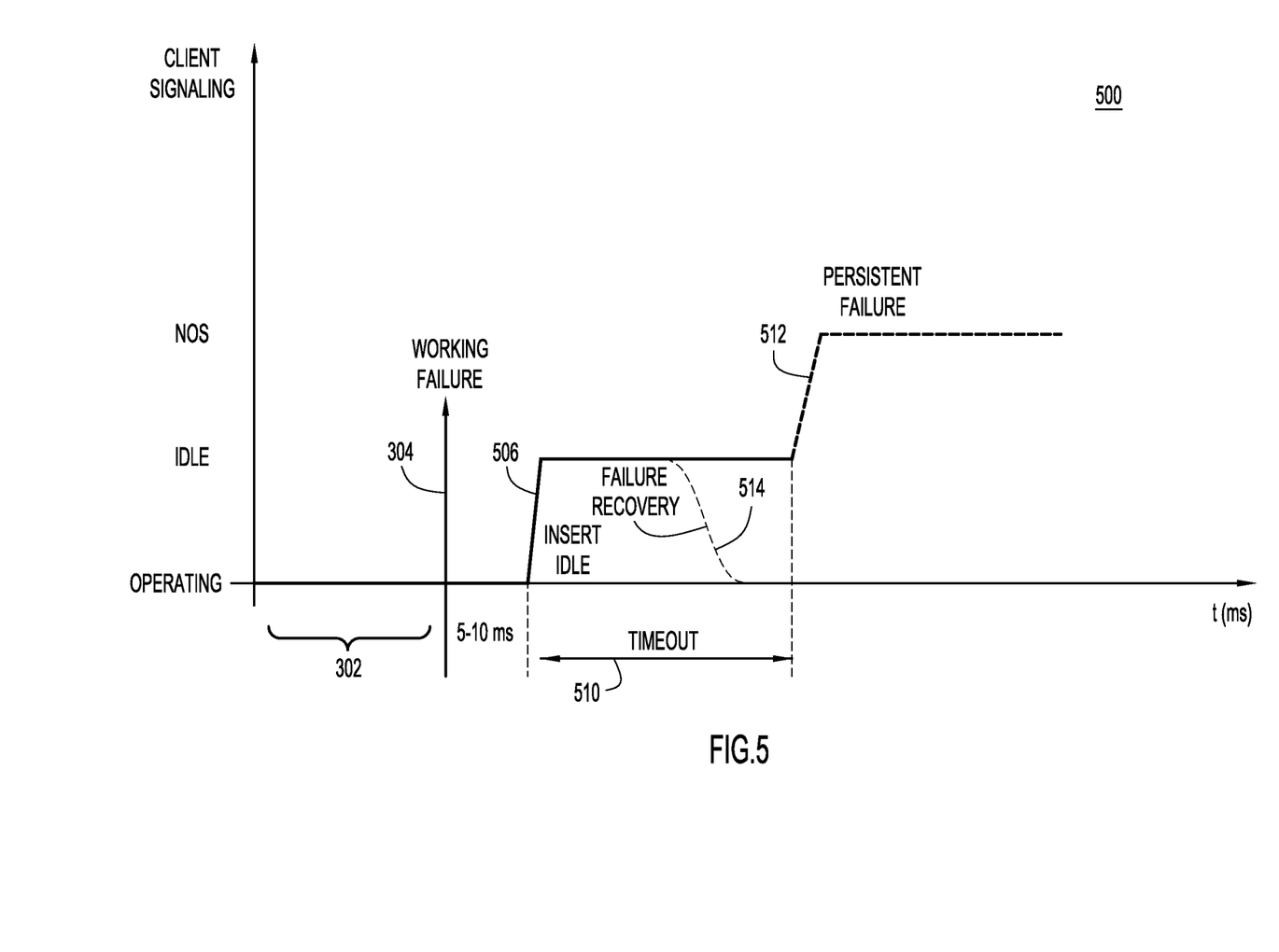
FIG. 5 is a timing diagram depicting operation of the system of FIG. 2 according to an example embodiment.

With reference to FIG. 5, there is shown an example timing diagram 500 of operation when the NOS message is delayed according to the procedure shown in FIG. 4. In FIG. 5, the y-axis represents client signaling (messages exchanged between a TXP/MXP and its local FC switch) and the x-axis represents time. Initial period 302 and failure 304 are as described above in connection with FIG. 3. The TXP/MXP detects the failure and responsive thereto, at 506, begins repeatedly sending idle messages to the local FC switch for a predetermined timeout period 510 instead of sending an NOS message to the local FC switch. If the failure persists throughout the entire timeout period 510, when the timeout period expires, at 512, the TXP/MXP ceases the idle messages and sends an NOS message to the local FC switch to trigger FC initialization. On the other hand, if the TXP/MXP detects failure recovery before the timeout period expires, at 514, the TXP/MXP ceases the idle frames and returns to normal operation.

Figure 6:
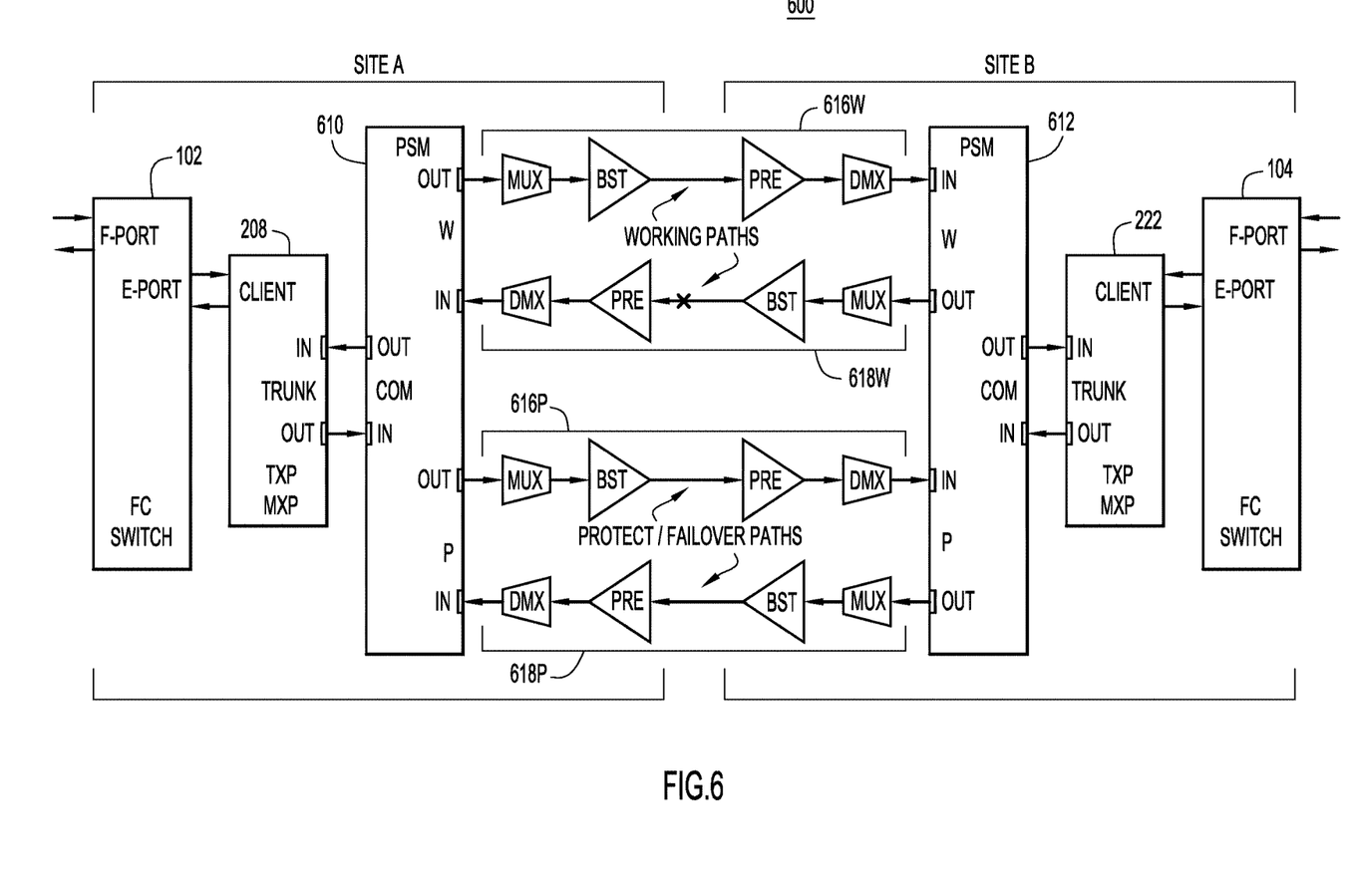
FIG. 6 is a block diagram of a system in a protected DWDM network and in which a delayed NOS message may be used, according to another example embodiment.

With reference to FIG. 6, there is a block diagram of an FC system 600 in which an NOS message is delayed according to another example embodiment. FC system 600 is similar to FC system 200 with the following exceptions. FC system 600 includes a protection switch module (PSM) 610 coupled to TXP/MXP 208 at site A, a PSM 612 coupled to TXP/MXP 222 at site B, forward and reverse working paths/links 616W and 618W (where suffix "W" denotes "working") coupled to and between PSMs 610 and 612, and forward and reverse protect or failover paths/links 616P and 618P (where suffix "P" denotes "protect") also coupled to and between PSMs 610 and 612 in parallel with the working paths. Forward paths 616W, 616P are each configured similarly to forward path 240 and reverse paths 618W, 618P are each configured similarly to reverse path 242.

PSM 610 includes: COM ports In and Out coupled to trunk ports Out and In of TXP/MXP 208, respectively; trunk-side working ports W Out and W In coupled to working forward and reverse paths 616W and 618W, respectively; and trunk-side protect ports P Out and P In coupled to protect forward and reverse paths 616P and 618P, respectively. PSM 610 is configured to (i) selectively connect COM port In to either trunk-side working port W Out or trunk-side protect port P Out so as to connect the trunk port Out of TXP/MXP 208 to either working forward path 616W or protect path 616P, respectively, and (ii) selectively connect COM port Out to either trunk-side working port W In or trunk-side protect port P In so as to connect either working reverse path 618W or protect reverse path 618P to the trunk port In of TXP/MXP 208, respectively. PSM 612 is configured similarly to PSM 610 with respect to TXP/MXP 222 and, therefore, the description of PSM 610 shall suffice for PSM 612.

In normal (default) operation, PSM 610 and PSM 612 connect working paths 616W and 618W to respective trunk ports of TXP/MXP 208 and 222 to support FC link 120 over both of the working paths, and monitor the working paths for any interruption of optical signals indicative of failure. If PSMs 610 and 612 detect any failure on any working path (e.g., PSM 610 detects a failure on working path 618W as indicated by the "X" intersecting reverse working path 618W in FIG. 6), responsive to the detected failure, the PSM (e.g., PSM 610) switches from the failed working path (e.g., working path 618W) to the corresponding protect path (e.g., protect path 618P), i.e., the PSM disconnects the appropriate trunk port of the TXP/MXP (e.g., the trunk port In of TXP/MXP 208) from the failed working path and connects the trunk port of the TXP/MXP to the protect path. This switchover to the protect path causes a short interruption in the optical signal at the trunk port of the TXP/MXP (e.g., TXP/MXP 208). In an example, the short interruption may last for several milliseconds.

In conventional operation of the TXP/MXP (e.g., TXP/MXP 208), the TXP/MXP detects the short interruption as a path/link failure, and relatively immediately issues an NOS message to the local FC switch (e.g., FC switch 102) as described above, and thus triggers FC initialization, even though the FC initialization is unnecessary because the PSM has switched to the protect path. Thus, switches 102 and 104 are unable to exchange FC frames normally until FC initialization completes, which wastes time and resources.

Accordingly, the PSMs 610 and 612 in combination with TXP/MXP 208 and TXP/MXP 222 are modified to delay sending of an NOS message responsive to a detected failure so as to delay triggering of FC initialization, and thus minimize any interruption of optical signals.

Figure 7:
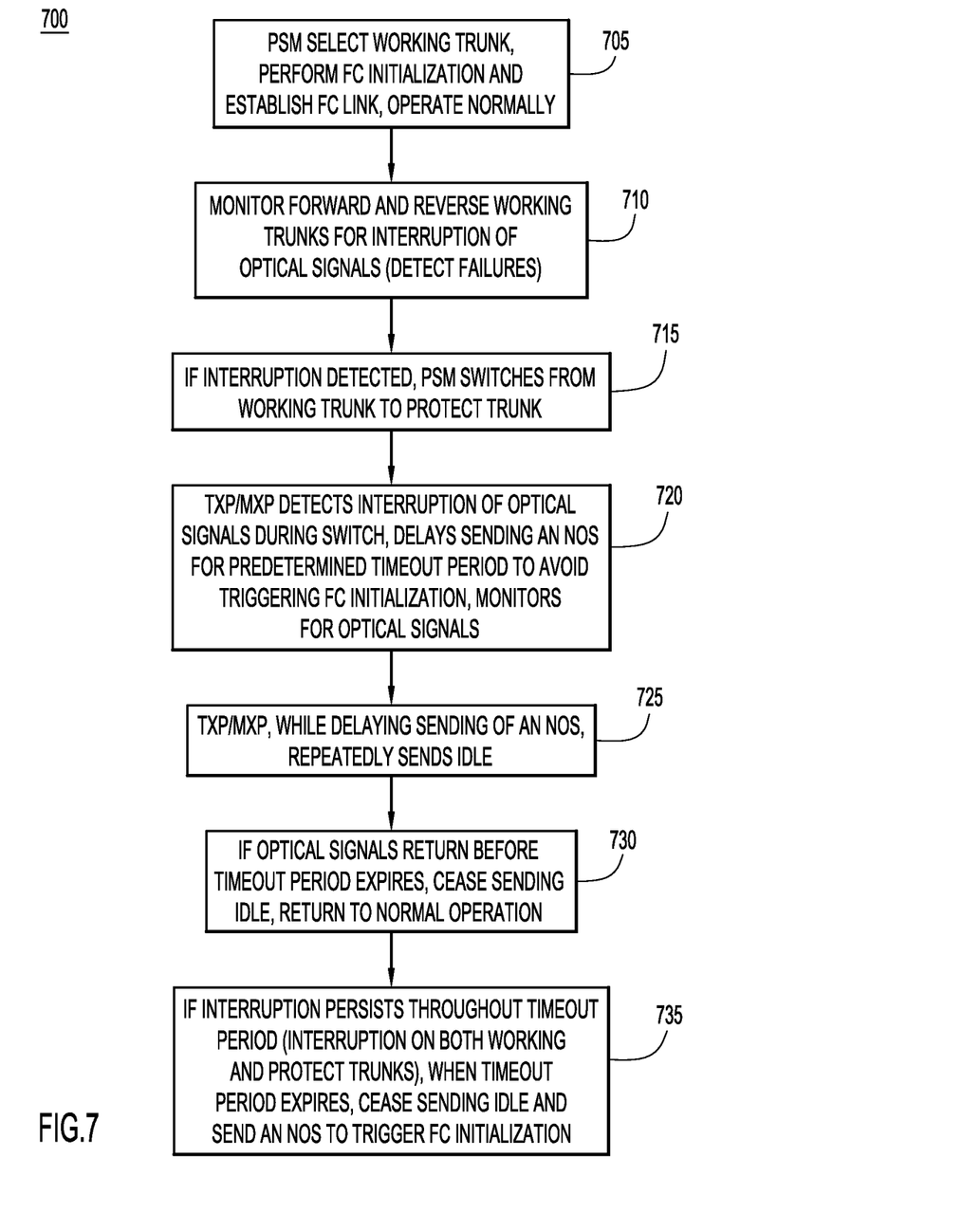
FIG. 7 is a flowchart of another method of delaying an NOS message responsive to an optical trunk failure, according to an example embodiment.

With reference to FIG. 7, there is a flowchart of a method 700 of delaying the NOS message in system 600 of FIG. 6, according to an example embodiment.

At 705, PSMs 610 and 612 are switched to their default positions, i.e., to select working trunks 616W and 616M. FC switches 102 and 104 perform FC initialization and establish normal bi-directional FC link (e.g., FC link 120) over working trunks 616W and 618W.

At 710, TXP/MXP 208, TXP/MXP 222, PSM 610, and PSM 612 monitor working trunks 616W and 618W for any interruptions of optical signals carried on the trunks indicative of failure.

At 715, if, for example, PSM 610 detects an interruption of optical signals from working trunk 618W, the PSM switches from working trunk 618W over to protect trunk 618P, which causes a short interruption, e.g., on the order of several milliseconds, in the optical signals provided to TXP/MXP 208.

At 720, TXP/MXP 208 also detects the interruption at its trunk port In. Responsive to the detected interruption, TXP/MXP 208 starts a predetermined timeout period, and delays sending of an NOS message to local FC switch 102 for the predetermined timeout period so as to delay triggering of an FC link initialization in the local FC switch. TXP/MXP 208 also continues to monitor for any interruption of optical signals at its trunk port In.

At 725, while TXP/MXP 208 delays sending of the NOS message for the predetermined timeout period, the TXP/MXP repeatedly sends idle messages to local FC switch 102 to enable the local FC switch to maintain bit, byte, and frame synchronization.

At 730, if the monitoring indicates a return of optical signals during the timeout period (i.e., failure recovery before the timeout period expires), when the optical signals return, TXP/MXP 208 ceases sending the idle messages and does not send an NOS message, and system 600 resumes normal operation. In another embodiment, TXP/MXP 208 waits until the timeout period expires, and then ceases sending the idle messages and does not send an NOS message, and system 600 resumes normal operation.

At 735, if the monitoring indicates persistent interruption of optical signals (i.e., failure of both working and protect trunks 618W and 618P) throughout the timeout period, when the timeout period expires, TXP/MXP 208 ceases sending the idle messages, and sends an NOS message to local FC switch 102 to trigger FC initialization.

The descriptions of method 700 above focuses on operations performed by PSM 210, TXP/MXP 208, and FC switch 102 by way of example, only; however, the description applies equally to PSM 212, TXP/MXP 222, and FC switch 104.

Figure 8:
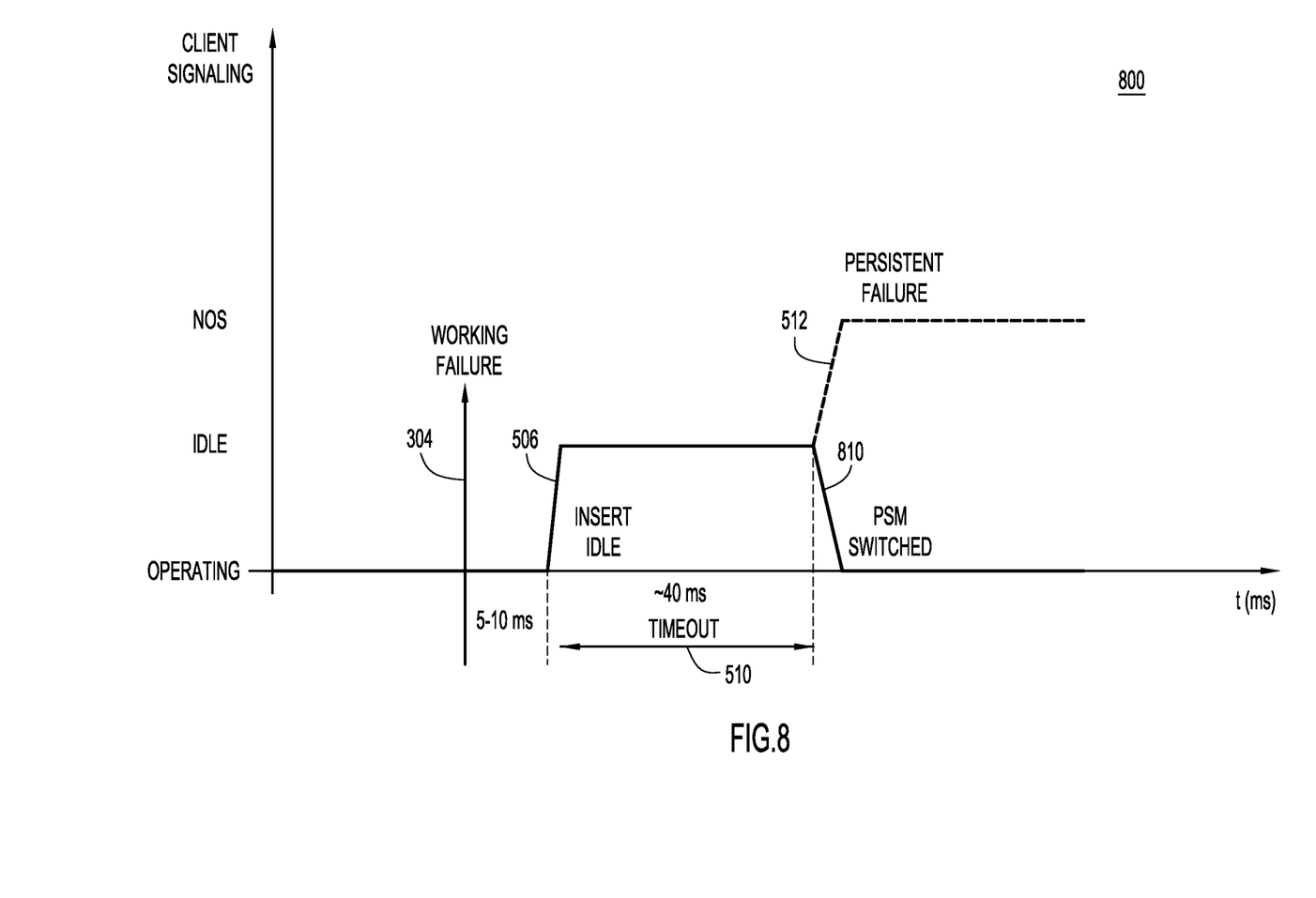
FIG. 8 is a timing diagram of the system of FIG. 6, and depicting operation according to an example embodiment.

With reference now to FIG. 8, there is shown a timing diagram 800 of operation of the system 600 when method 700 of FIG. 7 is performed. In FIG. 8, the y-axis represents client signaling (messages exchanged between a TXP/MXP and its local FC switch) and the x-axis represents time. Initial period 302 and failure 304 are as described above in connection with FIG. 3, except that the failure occurs on the working optical trunk. The TXP/MXP detects the failure on the working trunk and responsive thereto, at 506, begins sending idle messages to the local FC switch for a predetermined timeout period 510 instead of sending an NOS message to the local FC switch. The PSM also detects the failure of the working trunk and responsive thereto, at 810, switches from the working trunk to the failover optical trunk. Assuming optical signals are present on the failover optical trunk, the TXP/MXP ceases sending idle frames, does not send an NOS message, and normal operation ensues. If, on the other hand, the failure persists on both the working and failover optical trunks throughout the entire timeout period 510, when the timeout period expires, at 512, the TXP/MXP ceases the idle messages and sends an NOS message to the local FC switch to trigger FC initialization.

Figure 9:
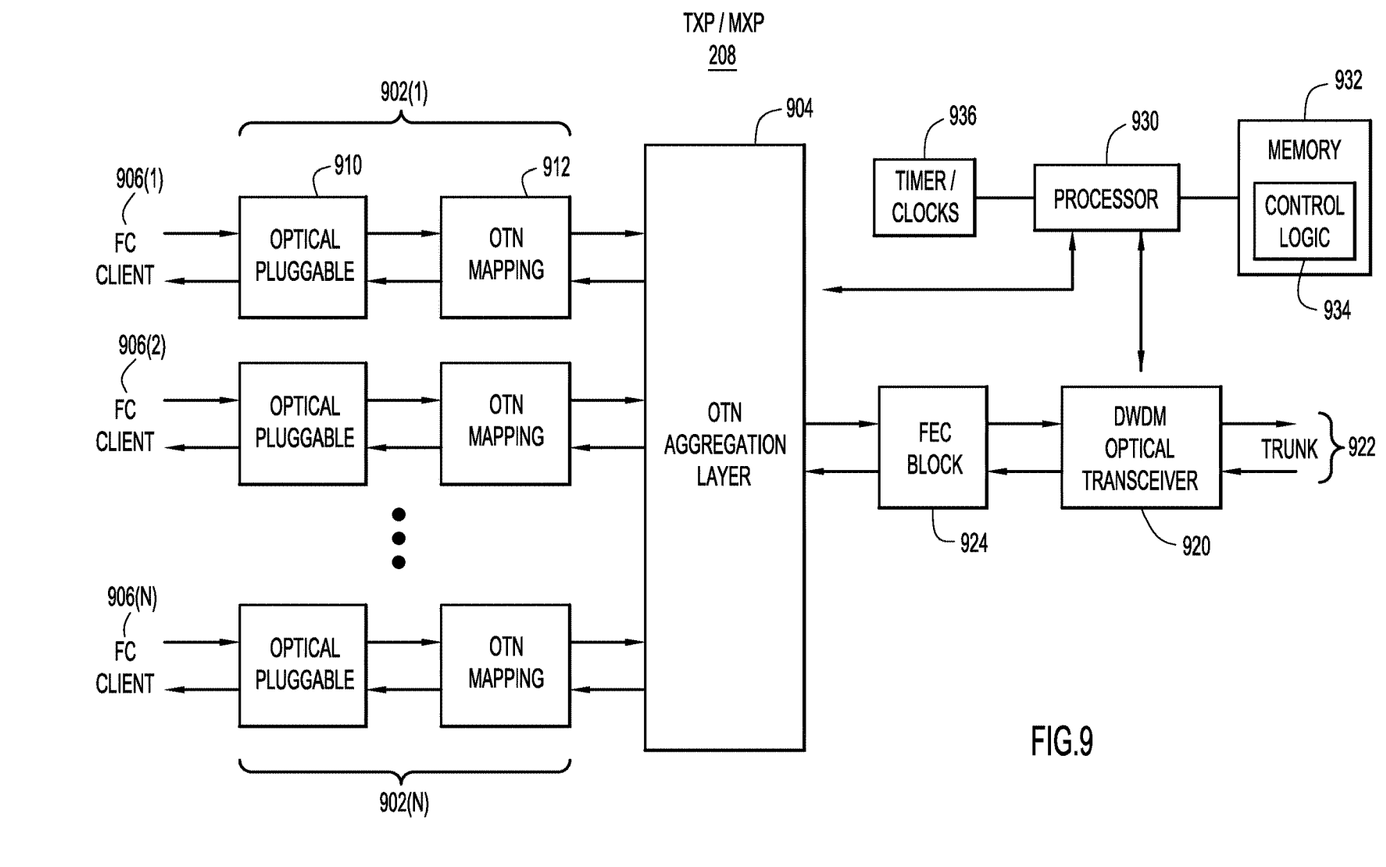
FIG. 9 is a block diagram of an optical transponder/muxponder (TXP/MXP) used in the systems of FIGS. 2 and 6, according to an example embodiment.

With reference to FIG. 9, there is a block diagram of TXP/MXP 208, which may also be representative of TXP/MXP 222. TXP/MXP 208 includes multiple bi-directional FC client channels 902(1)-902(N) coupled between an Optical Transport Network (OTN) aggregation layer module 904 and respective ones of FC client ports 906(1)-906(N). Each FC client channel 902(i) includes a respective optical pluggable transceiver module 910 and an OTN mapping module 912 coupled in series with other between a respective FC client port 906(i) and module 904. TXP/MXP 208 also includes a DWDM optical transceiver 920 coupled to trunk ports 922 and a forward error correction (FEC) block/module 924 that performs forward error correction coupled between module 904 and optical transceiver 920. Optical transceiver 920 may monitor power levels of optical signals received and transmitted by the transceiver and report the power levels to other components of TXP/MXP 208.

TXP/MXP 208 also includes a control processor 930 and a memory 932 for storing control logic 934 and data used by the control processor 930. Control processor 930 communicates with and controls each of the other components of TXP/MXP 208 described above. While processor 930 and memory 932 are shown separate from each other and the other components of TXP/MXP 208, the processor and memory may be integrated with the each other and the other components. TXP/MXP 208 may also include a timer/clock module 936 that processor 920 may control to generate timeout periods, although the timer/clock may be integrated with other components of the TXP/MXP.

Processor 930 in combination with the other components of TXP/MXP 208 described above processes instructions to perform operations to implement methods described herein. Memory 932 stores a variety of data and software instructions for execution by processor 930. Memory 320 may include read only memory (ROM) and random access memory (RAM) representing non-transitory memory storage devices. Processor 930 is, for example, a microprocessor or microcontroller that executes instructions for implementing the processes described herein. Thus, in general, the memory 932 may comprise one or more tangible (non-transitory) computer readable storage media (e.g., a memory device) encoded with software (e.g., control logic/software 934) comprising computer executable instructions and when the software is executed (by the processor 932) it is operable to perform the operations described herein.

In summary, TXP/MXP 208 includes a trunk port optical transceiver 920 configured to receive optical signals over an optical trunk from optical switch 104 and to monitor the received optical signals. TXP/MXP 208 also includes client port optical transceiver 910 of FC client channel 902(i) to send client optical signals to optical switch 102. TXP/MXP also includes processor modules 930, 924, 904, and 912 (collectively referred to as a "TXP/MXP processor"), coupled to trunk port optical transceiver 920 and client port optical transceiver 910, collectively configured to convert between the received optical signals and the client optical signals in accordance with a Fibre Channel (FC) protocol. The "TXP/MXP processor" is also configured to: detect an interruption of the received optical signals from the optical trunk; responsive to the interruption, delay sending of a Not Operational State (NOS) message to optical switch 102 so as to delay triggering of an FC link initialization in that optical switch; and while delaying sending of the NOS message, cause idle messages to be sent to optical switch 102.

Figure 10:
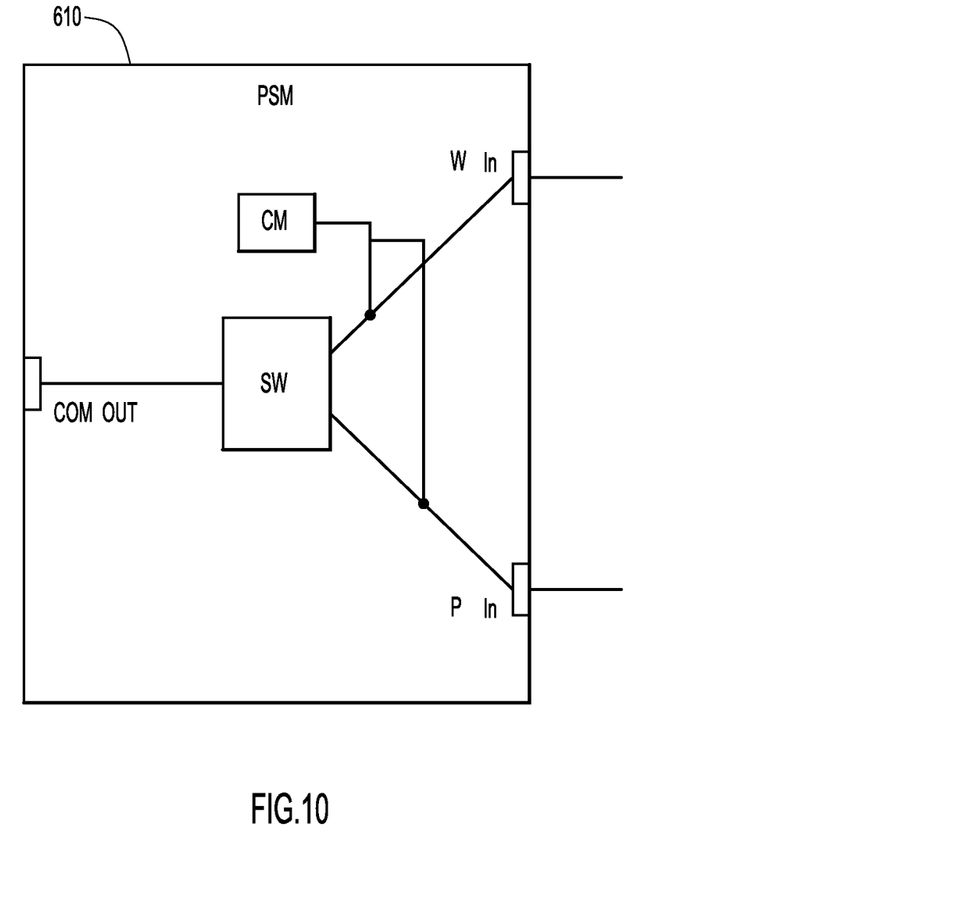
FIG. 10 is a block diagram of a protection switch module used in the system of FIG. 6, according to an example embodiment.

With reference to FIG. 10, a block diagram of PSM 610 is shown, according to an embodiment. The block diagram of PSM 610 is also representative of PSM 612. PSM 610 includes a switch SW having first and second inputs coupled to trunk ports W In and P In of the PSM, respectively, and an output coupled to COM port Out. PSM 610 also includes a control module CM that monitors optical power levels at each of the trunk ports W In, P In, and selectively controls the switch SW to either connect trunk port W In or trunk port P In to COM port Out based on the monitored power levels. Initially, control module CM sets switch SW in a default position to connect trunk port W In to COM port Out, and monitors the optical power level received at trunk port W In. If control module CM detects that the optical power level drops below a predetermined threshold indicative of failure, control module CM sets switch SW to connect trunk port P In to COM port Out.

To summarize, techniques and configurations are provided herein where, in the vent of an optical trunk failure, temporary sending of IDLE frames is immediately forced, and a NOS (or light failure, LF) message is delayed in case of a persistent trunk failure. This mechanism can reduce the service disruption time. In case of an optical Protection Module Switch, this disruption time can be reduced to less then 200 ms as opposed to the 10-15 seconds for full FC initialization.

In summary, in one form, in an optical system that converts optical signals received over an optical trunk from a first optical switch to client optical signals intended for a second optical switch, the first and second optical switches operating in accordance with a Fibre Channel (FC) protocol, a method is provided comprising: detecting an interruption of the optical signals from the optical trunk; responsive to the interruption, delaying sending of a Not Operational State (NOS) message to the second optical switch so as to delay triggering of an FC link initialization in the second optical switch; and while delaying sending of the NOS message, sending idle messages to the second optical switch.

In another form, an apparatus is provided comprising: a trunk port optical transceiver configured to receive optical signals over an optical trunk from a first optical switch and to monitor the received optical signals; a client port optical transceiver configured to send client optical signals to a second optical switch; and a processor coupled to the trunk port optical transceiver and client port optical transceiver and configured to convert between the received optical signals and the client optical signals in accordance with a Fibre Channel (FC) protocol, wherein the processor is configured to: detect an interruption of the received optical signals from the optical trunk; responsive to the interruption, delay sending of a Not Operational State (NOS) message to the second optical switch so as to delay triggering of an FC link initialization in the second optical switch; and while delaying sending of the NOS message, cause idle messages to be sent to the second optical switch.

In yet another form, a system is provided comprising: a protection switch module configured to concurrently receive optical signals from a working optical trunk and a parallel failover optical trunk between first and second optical switches that are configured to operate in accordance with a Fibre Channel (FC) protocol, the protection switch module further configured to selectively output the optical signals from either the working optical trunk or a protected optical trunk; and a muxponder configured to convert the optical signals output by the protection switch module to client optical signals intended for the second optical switch; wherein: the protection switch module is configured to initially selectively output the optical signal from the working optical trunk; the muxponder and the protection switch module are each configured to detect an interruption of optical signals from the working optical trunk and, responsive to detecting the interruption: the protection switch module is configured to selectively output the optical signals from the failover optical trunk instead of the working optical trunk; the muxponder is configured to: delay sending of an Not Operational (NOS) message to the second optical switch so as to delay triggering of FC link initialization; and while delaying sending of the NOS message, originate and send idle messages to the second optical.

The above description is intended by way of example only. Various modifications and structural changes may be made therein without departing from the scope of the concepts described herein and within the scope and range of equivalents of the claims.

What is claimed is:

1. In an optical system that converts optical signals received over an optical trunk from a first optical switch to client optical signals intended for a second optical switch, the first and second optical switches operating in accordance with Fibre Channel (FC) protocol, wherein the first switch is coupled to a muxponder that includes a processor and a timer, a method comprising:
   detecting, by the processor of the muxponder, an interruption of the optical signals from the optical trunk;
   responsive to the interruption:
   the processor starting a timeout period with the timer and monitoring the interruption;
   the processor delaying sending of a Not Operational State (NOS) message of the FC protocol to the second optical switch so as to delay triggering of an FC link initialization in accordance with the FC protocol in the second optical switch while the timeout period has not expired and the interruption persists; and
   while delaying sending of the NOS message, the processor repeatedly sending idle messages of the FC protocol in the time out period to the second optical switch to enable the second optical switch to maintain FC frame synchronization with the first optical switch.

2. The method of claim 1, wherein the timeout period is in a range of 100 to 500 milliseconds.

3. The method of claim 2, further comprising:
   if the monitoring indicates that the optical signals return during the timeout period, ceasing sending the idle messages, and not sending the NOS message.

4. The method of claim 3, further comprising:
   if the monitoring indicates that the interruption persists throughout the timeout period, when the timeout period expires, sending the NOS message to the second optical switch to trigger FC initialization.

5. The method of claim 1, further comprising, responsive to the interruption:
   switching the optical signals from the optical trunk to a failover optical trunk that also conveys the optical signals from the first optical switch; and
   monitoring for optical signals from the failover optical trunk.

6. The method of claim 5, wherein the timeout period is in a range of 100 to 500 milliseconds.

7. The method of claim 5, wherein:
   if the monitoring indicates that the optical signals are present during the timeout period, ceasing sending the idle messages, and not sending the NOS message.

8. The method of claim 5, wherein:
   if the monitoring indicates that an interruption of optical signals persists throughout the timeout period, when the timeout period expires, sending the NOS message to the second optical switch to trigger FC initialization.

9. The method of claim 1, further comprising:
prior to the detecting, receiving the optical signals over the optical trunk from the first optical switch and muxponding between the optical signals received from the optical trunk and the client optical signals.

10. An apparatus comprising:
a trunk port optical transceiver configured to receive optical signals over an optical trunk from a first optical switch and to monitor the received optical signals;
a client port optical transceiver configured to send client optical signals to a second optical switch; and
a muxponder coupled to the first optical switch, the muxponder including a processor and a timer;
the processor coupled to the trunk port optical transceiver and the client port optical transceiver and configured to convert between the received optical signals and the client optical signals in accordance with Fibre Channel (FC) protocol, wherein the processor is configured to:
detect an interruption of the received optical signals from the optical trunk from the first optical switch;
responsive to the interruption:
start a timeout period with the timer and monitoring the interruption;
delay sending of a Not Operational State (NOS) message of the FC protocol to the second optical switch so as to delay triggering of an FC link initialization in accordance with the FC protocol in the second optical switch while the timeout period has not expired and the interruption persists; and
while delaying sending of the NOS message, repeatedly cause idle messages of the FC protocol to be sent to the second optical switch in the time out period to enable the second optical switch to maintain FC frame synchronization with the first optical switch.

11. The apparatus of claim 10, wherein the timeout period is in a range of 100 to 500 milliseconds.

12. The apparatus of claim 10, wherein the processor is further configured to:
if the monitoring indicates the optical signals return during the timeout period, cease sending the idle messages, and not send the NOS message.

13. The apparatus of claim 12, wherein the processor is further configured to:
if the monitoring indicates the interruption persists throughout the timeout period, when the timeout period expires, send the NOS message to the second optical switch to trigger FC initialization.

14. The apparatus of claim 12, wherein the processor is configured to convert by muxponding between the client optical signals and the received optical signals.

15. A system comprising:
a protection switch module configured to concurrently receive optical signals from a working optical trunk and a parallel failover optical trunk between first and second optical switches that are configured to operate in accordance with Fibre Channel (FC) protocol, the protection switch module further configured to selectively output the optical signals from either the working optical trunk or a protected optical trunk; and
a muxponder coupled to the first optical switch, including a processor and a timer and configured to convert the optical signals output by the protection switch module to client optical signals intended for the second optical switch; wherein:
the protection switch module is configured to initially selectively output the optical signal from the working optical trunk;
the muxponder and the protection switch module are each configured to detect an interruption of optical signals from the working optical trunk and, responsive to detecting the interruption:
the protection switch module is configured to selectively output the optical signals from the failover optical trunk instead of the working optical trunk;
the processor of the muxponder is configured to:
start a timeout period with the timer and monitoring the interruption;
delay sending of an Not Operational State (NOS) message of the FC protocol to the second optical switch so as to delay triggering of FC link initialization in accordance with the FC protocol in the second optical switch while the timeout period has not expired and the interruption persists; and
while delaying sending of the NOS message, originate and repeatedly send idle messages of the FC protocol in the time out period to the second optical switch to enable the second optical switch to maintain FC frame synchronization with the first optical switch.

16. The system of claim 15, wherein each of the working optical trunk and the parallel failover optical trunk is connected to a forward link and a reverse link between the first optical switch and the second optical switch.

17. The system of claim 16, wherein the forward link includes an optical multiplexer and an optical boost amplifier connected in series, and the reverse link includes an optical demultiplexer and an optical preamplifier connected in series.

18. The system of claim 15, wherein the processor of the muxponder is further configured to, responsive to the interruption:
if the monitoring indicates that optical signals are present during the timeout period, when the optical signals are indicated as being present, cease sending the idle messages, and not send the NOS message.

19. The system of claim 15, wherein the processor of the muxponder is further configured to, responsive to the interruption:
if the monitoring indicates that an interruption of optical signals persists throughout the timeout period, when the timeout period expires, send the NOS message to the second optical switch to trigger FC initialization.

20. The system of claim 15, wherein the timeout period is in a range of 100 to 500 milliseconds.

* * * * *